United States Patent
Imamura et al.

(10) Patent No.: US 11,201,017 B2
(45) Date of Patent: Dec. 14, 2021

(54) METHOD FOR MANUFACTURING CAPACITOR

(71) Applicant: Panasonic Intellectual Property Management Co., Ltd., Osaka (JP)

(72) Inventors: Takeshi Imamura, Toyama (JP); Toshihisa Miura, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 268 days.

(21) Appl. No.: 16/525,027

(22) Filed: Jul. 29, 2019

(65) Prior Publication Data
US 2019/0348227 A1 Nov. 14, 2019

Related U.S. Application Data

(63) Continuation of application No. PCT/JP2018/003939, filed on Feb. 6, 2018.

(30) Foreign Application Priority Data

Feb. 28, 2017 (JP) .............................. JP2017-036448

(51) Int. Cl.
*H01G 13/00* (2013.01)
*H01G 4/224* (2006.01)
(Continued)

(52) U.S. Cl.
CPC .......... *H01G 13/006* (2013.01); *H01G 4/224* (2013.01); *H01G 4/236* (2013.01); *H01G 4/33* (2013.01); *H01G 13/003* (2013.01)

(58) Field of Classification Search
CPC ...... H01G 13/003; H01G 13/006; H01G 2/10; H01G 4/224; H01G 4/232; H01G 4/236; H01G 4/32; H01G 4/33
See application file for complete search history.

(56) References Cited

U.S. PATENT DOCUMENTS 4,882,653 A 11/1989 Suzuki et al.
5,642,255 A * 6/1997 Suzuki .................. H01G 2/103
361/517

(Continued)

FOREIGN PATENT DOCUMENTS

CN 105269835 A 1/2016
JP 61-174617 8/1986
(Continued)

OTHER PUBLICATIONS

International Search Report of PCT application No. PCT/JP2018/003939 dated May 1, 2018.
(Continued)

*Primary Examiner* — Minh N Trinh
(74) *Attorney, Agent, or Firm* — McDermott Will and Emery LLP

(57) ABSTRACT

A method for manufacturing a capacitor includes a step of forming a case integrated with a terminal unit designed to be connected with an external terminal, and a step of housing a capacitor element in the case so that the terminal unit is electrically connected to the capacitor element. The step of forming the case includes heating a metal mold to a temperature less than or equal to a glass transition temperature of a thermoplastic resin that is a material for the case. The metal mold internally has a mold part that is a hollow part having a shape of the case. And the step of forming the case further includes, after the heating of the metal mold and inserting the terminal unit into the mold part, injecting the thermoplastic resin in a molten state into the mold part of the metal mold.

3 Claims, 8 Drawing Sheets

(51) Int. Cl.
*H01G 4/236* (2006.01)
*H01G 4/33* (2006.01)

(56) References Cited

U.S. PATENT DOCUMENTS

| | | | | |
|---|---|---|---|---|
| 9,824,823 | B2* | 11/2017 | Sato | ............ H01G 13/006 |
| 2010/0128410 | A1* | 5/2010 | Lee | ............ H01G 2/08 |
| | | | | 361/274.3 |
| 2015/0348710 | A1 | 12/2015 | Sato et al. | |
| 2019/0348227 | A1* | 11/2019 | Imamura | ............ H01G 4/224 |

FOREIGN PATENT DOCUMENTS

| | | |
|---|---|---|
| JP | 1-211908 | 8/1989 |
| JP | 4-173313 | 6/1992 |
| JP | 4-272671 | 9/1992 |
| JP | 2014-116445 | 6/2014 |
| JP | 2015-079837 | 4/2015 |

OTHER PUBLICATIONS

English Translation of Chinese Office Action dated Jan. 4, 2021 for the related Chinese Patent Application No. 201880013374.3.

* cited by examiner

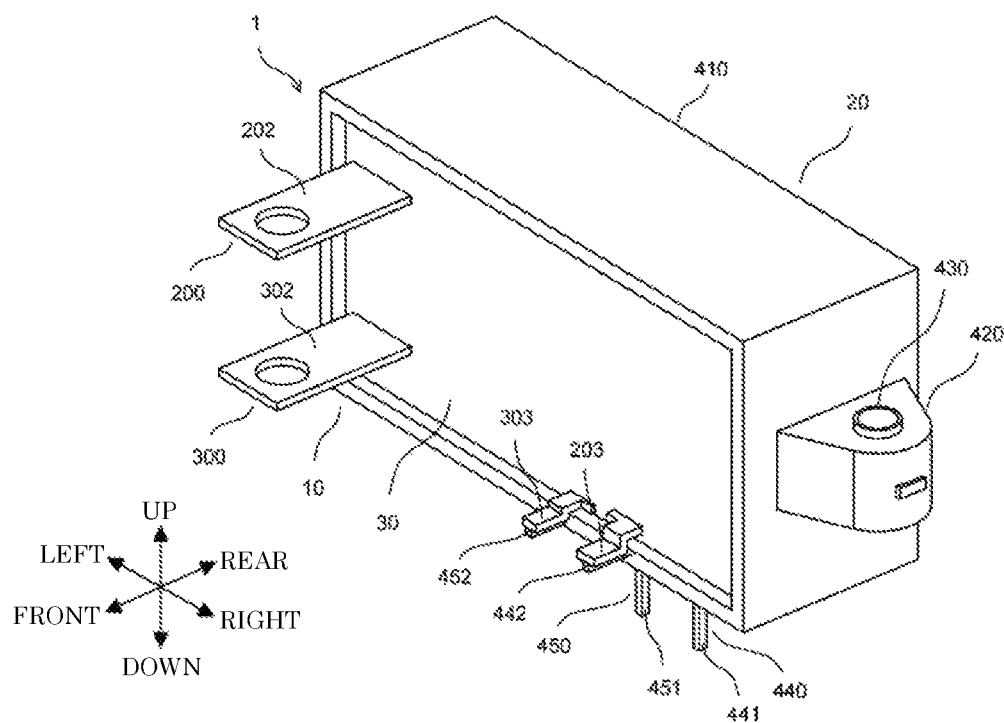

METHOD FOR MANUFACTURING CAPACITOR

RELATED APPLICATIONS

This application is a continuation of the PCT International Application No. PCT/JP2018/003939 filed on Feb. 6, 2018, which claims the benefit of foreign priority of Japanese patent application No. 2017-036448 filed on Feb. 28, 2017, the contents all of which are incorporated herein by reference.

BACKGROUND

1. Technical Field

The present disclosure relates to a method for manufacturing a capacitor.

2. Description of the Related Art

Unexamined Japanese Patent Publication No. 2014-116445 discloses a case-molded capacitor in which a case filled with a mold resin houses a capacitor element and part of a pair of bus bars. The case-molded capacitor includes a cutout formed in a part of a side surface of the case, a sealing plate that is joined to the cutout so as to seal the cutout, and a terminal part of the pair of bus bars that is intended for external connection. The terminal part is drawn out from the case by passing through the sealing plate.

SUMMARY

A method for manufacturing a capacitor, according to a main aspect of the present disclosure, includes a step of forming a case integrated with a terminal unit designed to be connected with an external terminal, and a step of housing a capacitor element in the case so that the terminal unit is electrically connected to the capacitor element. The step of forming the case includes heating a metal mold to a temperature less than or equal to a glass transition temperature of a thermoplastic resin that is a material for the case. The metal mold internally has a mold part that is a hollow part having a shape of the case. And the step of forming the case further includes, after the heating of the metal mold and inserting the terminal unit into the mold part, injecting the thermoplastic resin in a molten state into the mold part of the metal mold.

The present disclosure provides a method of manufacturing a capacitor so as to prevent a burr from generating on a case in molding process and dispense with a process of burr removal.

Effects or meanings of the present disclosure will be further clarified in the following description of an exemplary embodiment. However, the exemplary embodiment shown below is merely one example of implementing the present disclosure, and the present disclosure is not at all limited to the example described in the following exemplary embodiment.

BRIEF DESCRIPTION OF THE DRAWINGS

FIG. 1A is a perspective view illustrating a film capacitor according to an exemplary embodiment;

FIG. 1B is a perspective view illustrating the film capacitor according to the exemplary embodiment from which a filler resin is omitted;

DETAILED DESCRIPTION OF EMBODIMENT

Figure 2A:
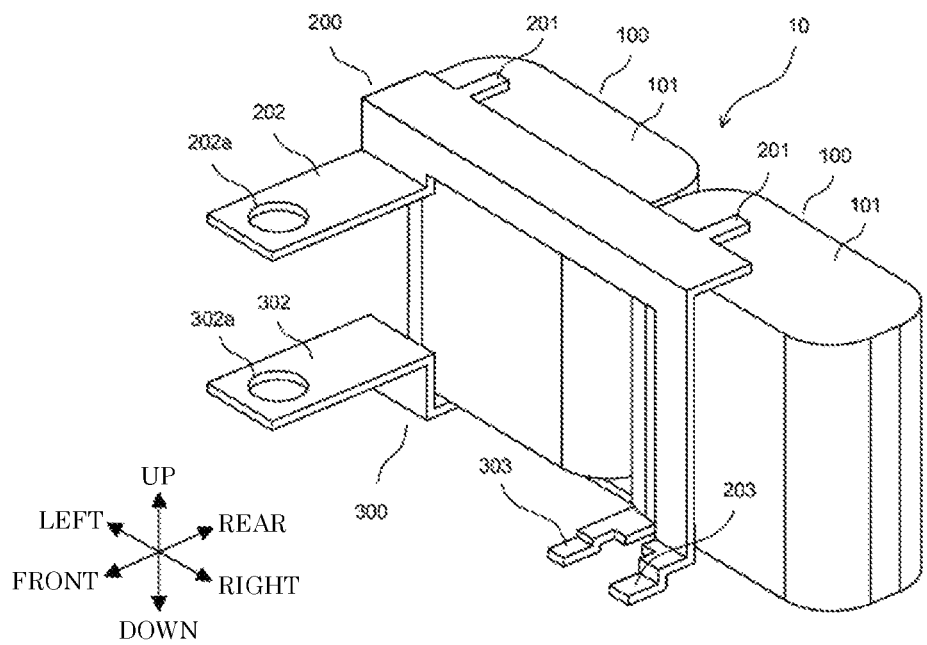
FIG. 2A is a perspective view illustrating a capacitor unit according to the exemplary embodiment.

Prior to the description for exemplary embodiments of the present disclosure, problems in the conventional technique will be simply described. In a case-molded capacitor, when a terminal unit for external connection is drawn out through a place on a side surface of a case, the case may be formed by injection molding such that the terminal unit is integrated with the case by insert molding instead of the method disclosed in Unexamined Japanese Patent Publication No. 2014-116445. If this procedure is employed, a bus bar is electrically connected to the terminal unit after a capacitor element and the bus bar are housed in the case. In the case-molded capacitor having this configuration, as disclosed in Unexamined Japanese Patent Publication No. 2014-116445, there is a concern about leakage of the mold resin through a gap between the sealing plate and the cutout formed in the case of the capacitor.

When the case is formed by molding, a metal mold is heated to a temperature ranging from 130° C. to 150° C., and a molten resin is injected into the heated metal mold. In this case, a burr may be generated on the molded case at a position such as a place of mating (separation) surfaces of components of the metal mold. Because of this, the burr needs to be removed from the molded case. As a method for automatic burr removal, abrasive blasting is generally performed to remove burrs by blasting fine abrasive particles such as glass beads and scrubs.

If a terminal unit is integrated with a case by insert molding as described above, abrasive particles tend to be blasted against the terminal unit by abrasive blasting. Unfortunately, this may roughen a surface of the terminal unit, increase electric resistance between terminal surfaces if the terminal unit is connected to an external terminal, and hamper a flow of electric current into the external terminal. If the terminal unit has relatively low strength, the terminal unit may be deformed by the force of blasted abrasive particles and deteriorate in position accuracy. This may prevent the terminal unit from smoothly connecting with the external terminal.

In view of the above problems, the present disclosure provides a method of manufacturing a capacitor so as to prevent a burr from generating on a case in molding process and dispense with a process of burr removal.

An exemplary embodiment of the present disclosure will be described below with reference to the accompanying drawings. For the sake of convenience, directions including front and rear, left and right, and up and down are added to the drawings as appropriate. These directions in the drawings are not absolute directions but relative directions of film capacitor 1 and components.

In this exemplary embodiment, attachment tab 420 corresponds to an "attachment part" described in the appended claims. First connection pin terminal 440 and second connection pin terminal 450 correspond to a "terminal unit" described in the appended claims.

However, the above description is only intended to define correspondences between components in the claims and components in the exemplary embodiment. The correspondences described above do not limit the scope of the disclosure in the claims to the configuration described in the exemplary embodiment.

<Structure of Film Capacitor>

First, film capacitor 1 according to the present exemplary embodiment will be described. Film capacitor 1 is made by a method for manufacturing a capacitor according to the present exemplary embodiment, which will be described later.

Figure 2B:
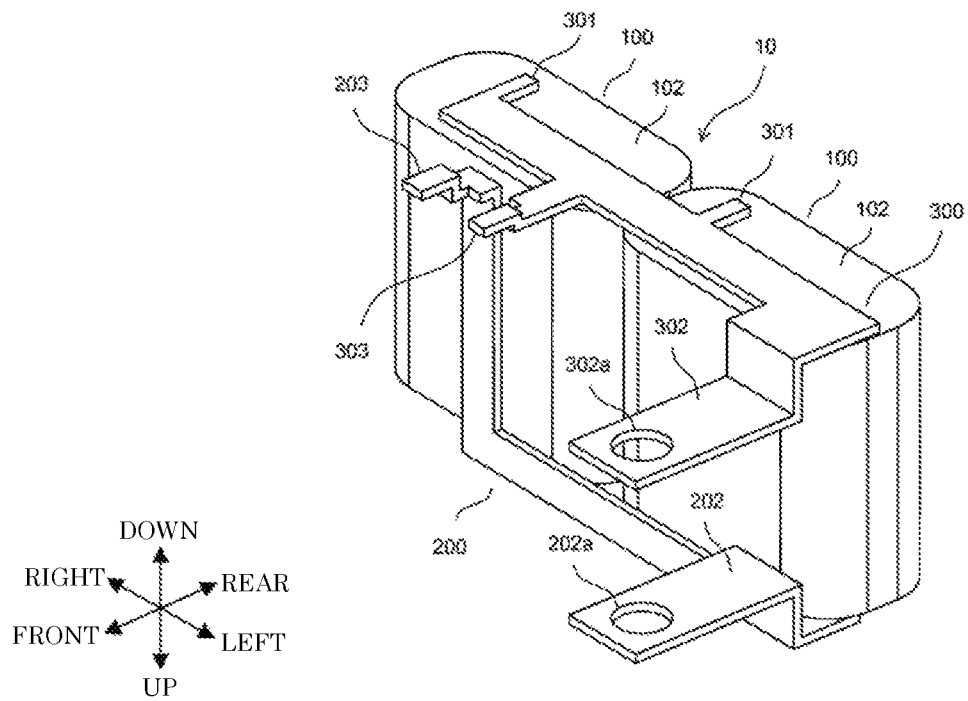
FIG. 2B is a perspective view illustrating the capacitor unit turned upside down according to the exemplary embodiment.
Figure 3A:
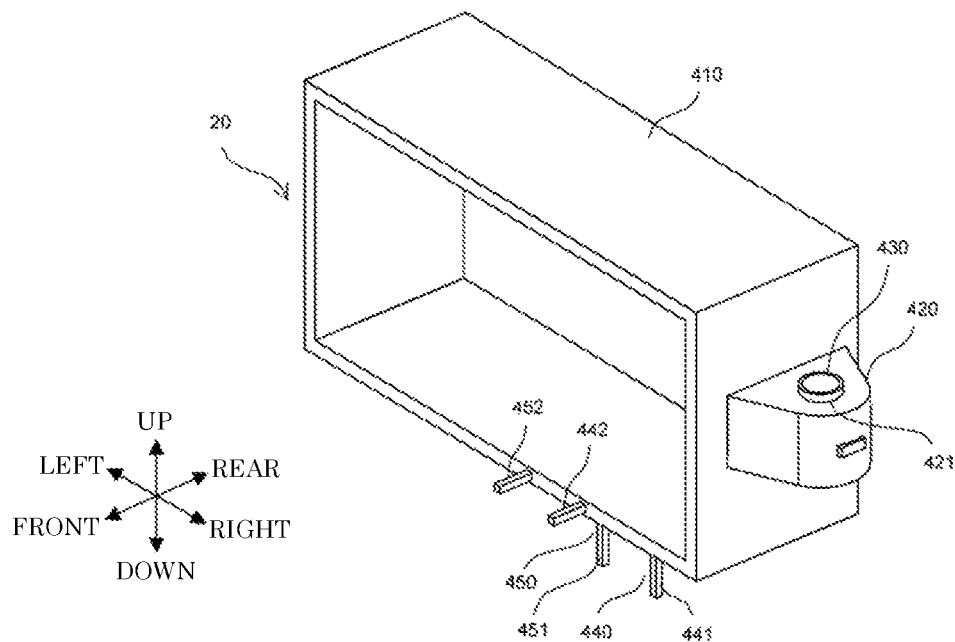
FIG. 3A is a perspective view illustrating a case according to the exemplary embodiment.
Figure 3B:
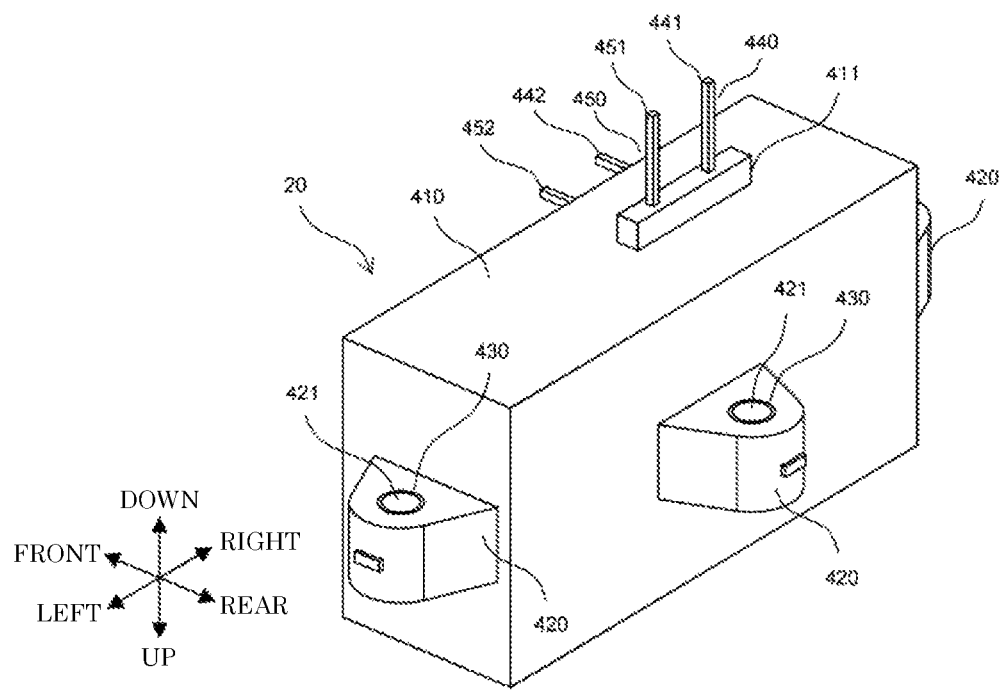
FIG. 3B is a perspective view illustrating the case turned upside down according to the exemplary embodiment.

FIG. 1A is a perspective view illustrating film capacitor 1 according to the exemplary embodiment. FIG. 1B is a perspective view illustrating film capacitor 1 according to the exemplary embodiment from which filler resin 30 is omitted. FIG. 2A is a perspective view illustrating capacitor unit 10 according to the exemplary embodiment. FIG. 2B is a perspective view illustrating capacitor unit 10 turned upside down according to the exemplary embodiment. FIG. 3A is a perspective view illustrating case 20 according to the exemplary embodiment. FIG. 3B is a perspective view illustrating case 20 turned upside down according to the exemplary embodiment.

Film capacitor 1 includes capacitor unit 10, case 20, and filler resin 30. Capacitor unit 10 includes two capacitor elements 100, first bus bar 200, and second bus bar 300.

Capacitor element 100 is formed by stacking two metalized films that are each a dielectric film on which aluminum is deposited, winding or laminating the stacked metalized films, and pressing the wound or laminated films to have a flat shape. In capacitor element 100, first end-face electrode 101 is formed on an upper end surface by spraying metal such as zinc, and similarly, second end-face electrode 102 is formed on a lower end surface by spraying metal such as zinc. Two capacitor elements 100 are aligned along a right-left direction and are housed in case 20 with both the end surfaces facing upward and downward, respectively.

Although capacitor element 100 of the present exemplary embodiment is formed of metalized films that are each a dielectric film on which aluminum is deposited, capacitor element 100 may be formed of metalized films having different metal such as zinc or magnesium deposited on each of the films. Alternatively, from among such metals, capacitor element 100 may be formed either of metalized films having a plurality of metals deposited on each of the films or of metalized films having an alloy of such metals deposited on each of the films.

First bus bar 200 is formed by appropriately cutting out and bending a conductive material such as a copper plate, and includes two first electrode terminals 201, first connection terminal 202, and first junction terminal 203. Two first electrode terminals 201 are electrically connected to first end-face electrodes 101 of respective capacitor elements 100 by a connection method such as soldering. First connection terminal 202 projects frontward at an upper position of left-side capacitor element 100. First connection terminal 202 has circular attachment hole 202a through which an external terminal (not shown) is fastened to first connection terminal 202 with a screw. First junction terminal 203 projects frontward at a lower position of right-side capacitor element 100.

Second bus bar 300 is formed by appropriately cutting out and bending a conductive material such as a copper plate, and includes two second electrode terminals 301, second connection terminal 302, and second junction terminal 303. Two second electrode terminals 301 are electrically connected to second end-face electrodes 102 of respective capacitor elements 100 by a connection method such as soldering. Second connection terminal 302 projects frontward at a lower position of left-side capacitor element 100 so as to be placed to face first connection terminal 202. Second connection terminal 302 has circular attachment hole 302a through which an external terminal (not shown) is fastened to second connection terminal 302 with a screw. Second junction terminal 303 projects frontward at a lower position of right-side capacitor element 100 so as to be adjacent to first junction terminal 203.

Case 20 is made of a polyphenylene sulfide (PPS) resin, which is a crystalline thermoplastic resin, and includes case body 410 and three attachment tabs 420. Case body 410 is a box having a substantially rectangular parallelepiped shape and opens at a front face. Attachment tabs 420 are formed on a left surface, a right surface, and a rear surface, respectively, of case body 410. Attachment tab 420 has circular attachment hole 421 that passes through in an up-down direction. Cylindrical collar 430 made of a metallic material is embedded inside attachment hole 421 by insert molding. Terminal block 411 is formed on a lower surface of case body 410 and is disposed rightward from a middle of the lower surface. The terminal block has a rectangular parallelepiped shape that is long laterally.

First connection pin terminal 440 and second connection pin terminal 450 are integrated with case 20 by insert molding. Each of first connection pin terminal 440 and second connection pin terminal 450 has pin-shape including an L-shaped bend, and has gold plating applied to a surface of a base core made of nickel.

One end of first connection pin terminal 440 projects downward from terminal block 411 as connection end 441, and is configured to connect with an external terminal (not shown). The other end of first connection pin terminal 440 projects frontward from an edge of the open front face of case body 410 as junction end 442. Similarly, one end of second connection pin terminal 450 projects downward from terminal block 411 as connection end 451 and is configured to connect with an external terminal. The other end of second connection pin terminal 450 projects frontward from the edge of the open front face of case body 410 as junction end 452. Junction end 442 of first connection pin terminal 440 is electrically connected to first junction terminal 203 of first bus bar 200 by a connection method such as soldering, whereas junction end 452 of second connection pin terminal 450 is electrically connected to second junction terminal 303 of second bus bar 300 by a connection method such as soldering.

Filler resin 30 is made of a thermosetting resin, such as an epoxy resin, is injected into case 20 in a molten state, and is cured by heating case 20. Filler resin 30 covers capacitor elements 100 and part of first bus bar 200 and part of second bus bar 300 of capacitor unit 10 to protect the covered parts from moisture and impacts.

<Method for Manufacturing Film Capacitor>

Figure 4A:
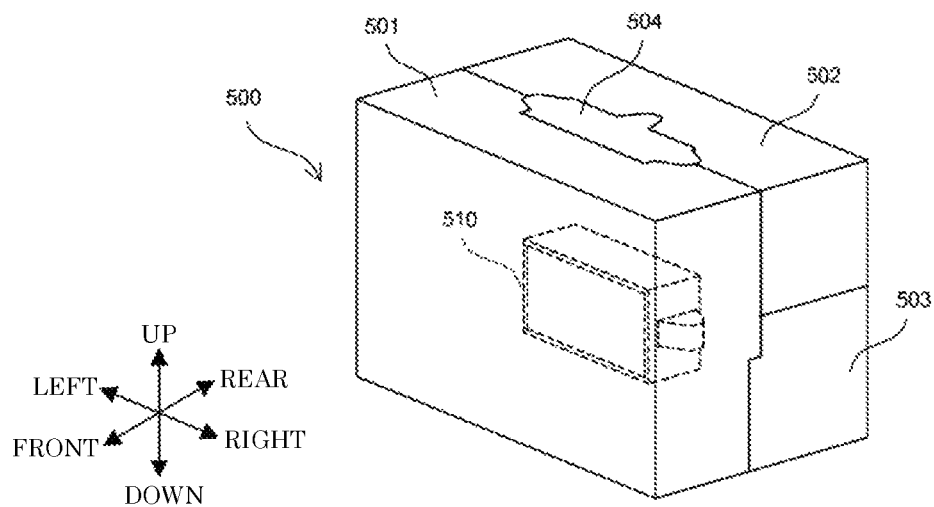
FIG. 4A is a perspective view illustrating a metal mold used to form the case by injection molding according to the exemplary embodiment.
Figure 4B:
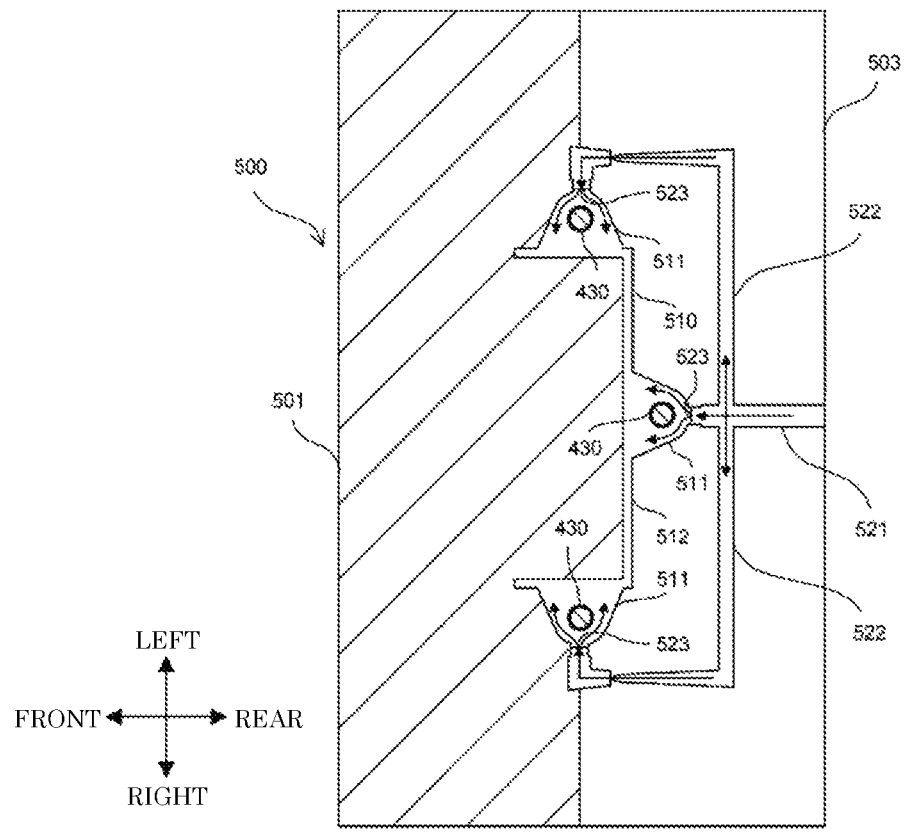
FIG. 4B is a cross-sectional plan view of the metal mold cut along a plane including a position of a sprue and a runner according to the exemplary embodiment.
Figure 5A:
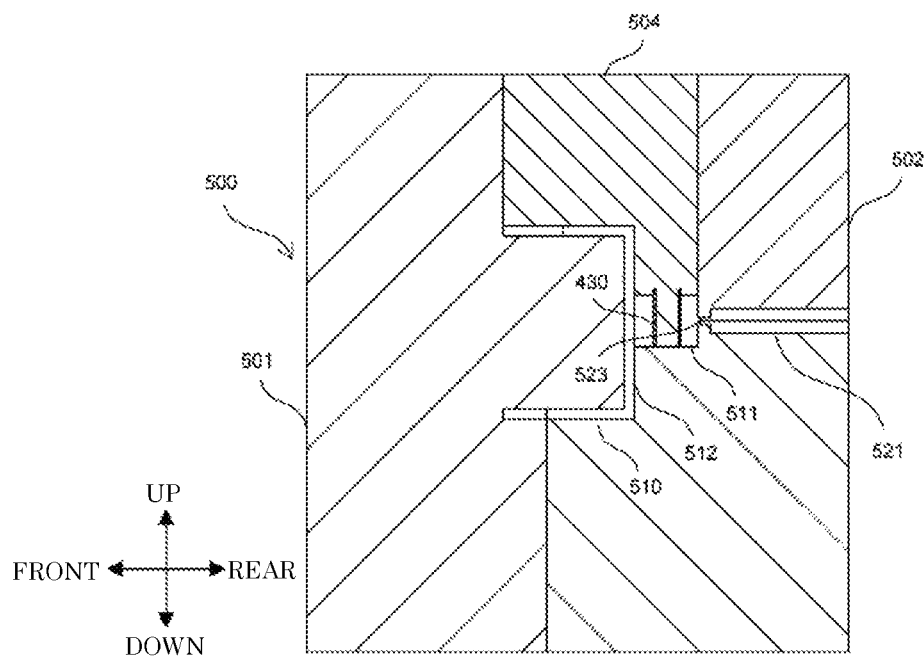
FIG. 5A is a side cross-sectional view of the metal mold cut along a plane including a middle of the metal mold in a right-left direction according to the exemplary embodiment.
Figure 5B:
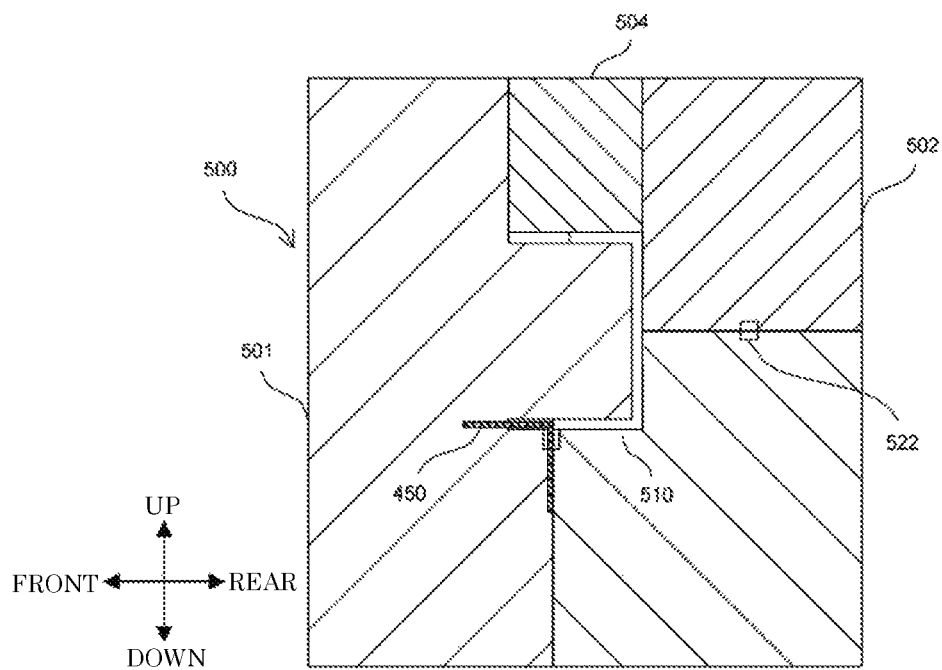
FIG. 5B is a side cross-sectional view of the metal mold cut along a plane including a position of a second connection pin terminal according to the exemplary embodiment.

Next, a method for manufacturing film capacitor 1 will be described. FIG. 4A is a perspective view illustrating metal mold 500 used to form case 20 by injection molding according to the exemplary embodiment. FIG. 4B is a cross-sectional plan view of metal mold 500 cut along a plane including a position of sprue 521 and runner 522 according to the exemplary embodiment. FIG. 5A is a side cross-sectional view of metal mold 500 cut along a plane including a middle of the metal mold in the right-left direction according to the exemplary embodiment. FIG. 5B is a side cross-sectional view of metal mold 500 cut along a plane including a position of second connection pin terminal 450 according to the exemplary embodiment.

Case 20 is formed by injection molding in a process of case manufacturing included in a process for manufacturing film capacitor 1. Metal mold 500 for forming case 20 is made of steel. And metal mold 500 includes first component 501 on a front side, second component 502 on an upper rear side, third component 503 on a lower rear side, and fourth component 504 inserted into a space between first component 501 and second component 502 from above. These components are joined together.

Metal mold 500 internally has mold part 510 that is a hollow part having the shape of case 20. In metal mold 500, sprue 521 and two runners 522 through which a molten PPS resin flows is formed. The molten PPS resin is injected into mold part 510. Gates 523 that are inlets for the resin flowing into mold part 510 are formed at portions 511 of mold part 510 corresponding to respective three attachment tabs 420 (see FIG. 4B). Upper second component 502 and lower third component 503 are joined together at a level of the position of sprue 521 and runners 522. Before components 501, 502, 503, 504 are joined together, three collars 430 and first and second connection pin terminals 440 and 450 are inserted at respective predetermined positions in mold part 510 (see FIGS. 5A and 5B).

Figure 6:
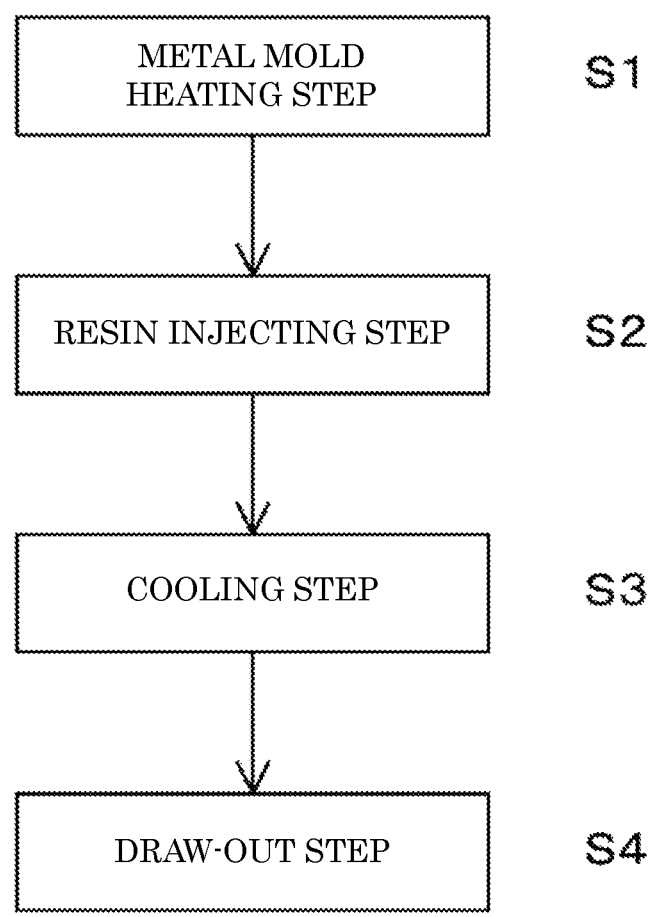
FIG. 6 is a flowchart showing a process for manufacturing the case by injection molding according to the exemplary embodiment.

FIG. 6 is a flowchart showing a process for manufacturing the case by injection molding according to the exemplary embodiment.

When case 20 is formed inside metal mold 500, a metal mold heating step is first executed (S1). Specifically, metal mold 500 is heated to a predetermined temperature by a heater (not shown) and is substantially maintained at the predetermined temperature. The predetermined temperature is a temperature ranging from 60° C. to 90° C., inclusive, and may be, for example, set at 80° C.

Next, while metal mold 500 is substantially maintained at the predetermined temperature, a resin injecting step is executed (S2). Specifically, a molten PPS resin is injected into mold part 510 from gates 523 through sprue 521 and runners 522 so that mold part 510 is filled with the resin. The molten PPS resin may be, for example, set at 320° C. in temperature.

The PPS resin is injected from portions 511 of mold part 510 corresponding to three attachment tabs 420 to flow toward portion 512 of mold part 510 corresponding to case body 410. By this configuration, a join of the PPS resin flows does not occur at a tip of each attachment tab 420 and thus the generation of a weld line at the tip is suppressed unlike the case where a PPS resin flows from portion 512 corresponding to case body 410 toward portions 511 corresponding to attachment tabs 420.

When the PPS resin has spread throughout mold part 510 so that case 20 is formed, a cooling step is executed (S3). Specifically, after the injection of the PPS resin into mold part 510 stops, the PPS resin is kept stand for a predetermined period of time, i.e. around several tens of seconds, while metal mold 500 is substantially maintained at the predetermined temperature, and case 20 is thereby cooled naturally.

Next, a draw-out step is executed (S4). The components of metal mold 500 are separated from one another and case 20 is drawn out of the metal mold. The gates of drawn out case 20 are cut so that resin parts corresponding to sprue 521 and runners 522 are removed.

Case 20 made of the PPS resin is thus completed. Case 20 includes inserted first connection pin terminal 440 and second connection pin terminal 450.

In a process after forming case 20 through the process of case manufacturing as described above, capacitor unit 10, i.e. two capacitor elements 100, first bus bar 200, and second bus bar 300 are housed in case 20. Two capacitor elements 100 are electrically connected with first connection pin terminal 440 via first bus bar 200 and second connection pin terminal 450 via second bus bar 300, respectively. In a process following that, filler resin 30 is filled into case 20 and is cured to complete film capacitor 1.

Figure 7A:
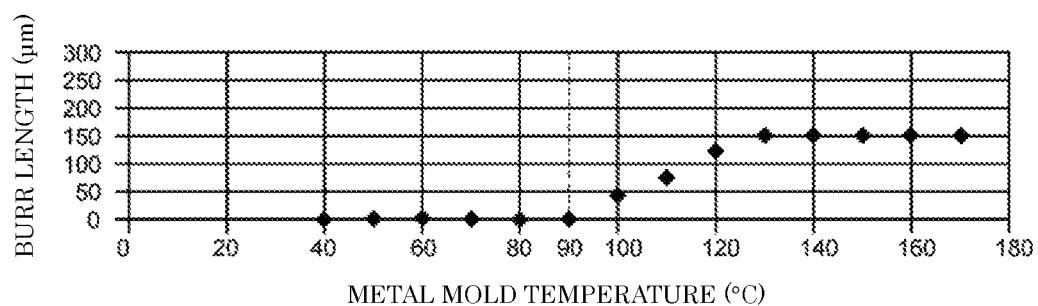
FIG. 7A is a graph showing a relationship between a temperature of the metal mold during molding and a length of a burr generated on the case according to the exemplary embodiment.
Figure 7B:
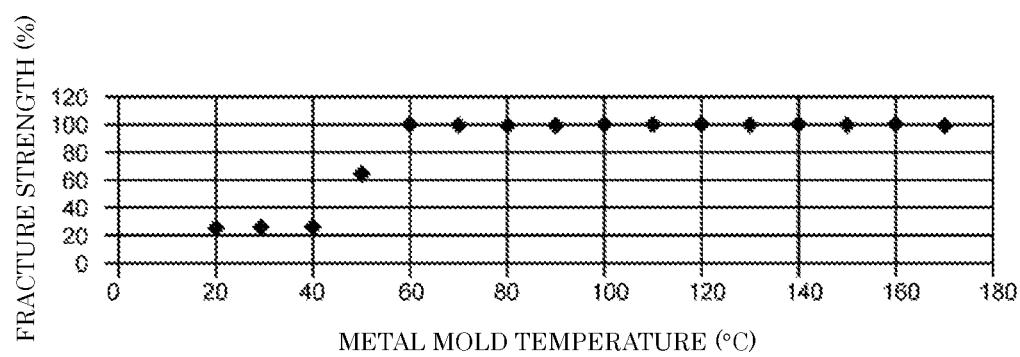
FIG. 7B is a graph showing a relationship between a temperature of the metal mold during molding and a fracture strength of the case according to the exemplary embodiment.
Figure 7C:
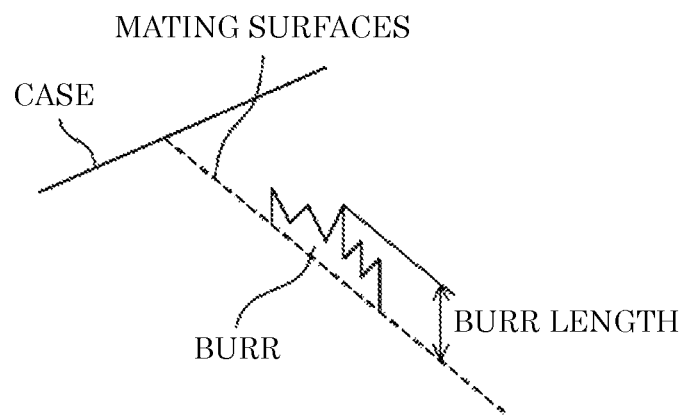
FIG. 7C is a drawing explaining a method of measuring a length of a burr on the case according to the exemplary embodiment.
Figure 7D:
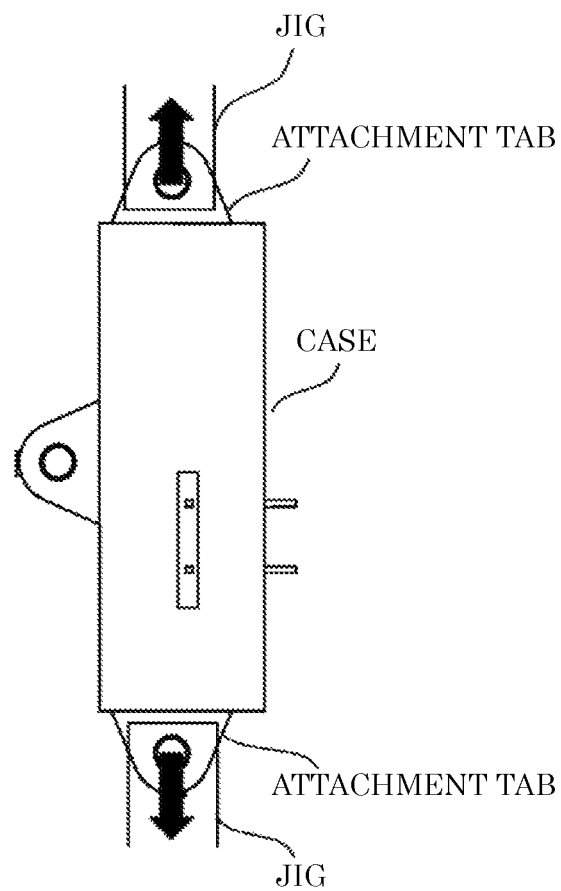
FIG. 7D is a drawing explaining a method of measuring a fracture strength of the case according to the exemplary embodiment.

FIG. 7A is a graph showing a relationship between a temperature of a metal mold during molding and a length of a burr generated on a case according to the exemplary embodiment. FIG. 7B is a graph showing a relationship between a temperature of a metal mold during molding and a fracture strength of a case according to the exemplary embodiment. FIG. 7C is a drawing explaining a method of measuring a length of a burr on a case according to the exemplary embodiment. FIG. 7D is a drawing explaining a method of measuring a fracture strength of a case according to the exemplary embodiment.

The graph of FIG. 7A shows measurement results of lengths of burrs generated on cases that are formed of a PPS resin in a metal mold at respective temperatures changed from 40° C. to 170° C. in 10° C. increments. A clearance (a gap) between mating (separation) surfaces of components of metal mold 500 during molding was set at less than or equal to 20 μm, which is permissible in normal injection molding processes. As shown in FIG. 7C, a thin plate-shaped burr can be generated on a case at a position opposed to mating surfaces of metal mold 500 so as to extend along the mating surfaces. A largest protrusion length of each generated burr in a direction of extension along the mating surfaces was measured using a magnifying glass and other tools, so that the graph of FIG. 7A shows the largest protrusion lengths as burr lengths.

According to the graph of FIG. 7A, the metal mold set at a temperature of less than or equal to 90° C. during molding of the case suppresses the generation of a burr on the case. In other words, in the temperature range, virtually no burr is generated on the case.

The temperature of 90° C. is equivalent to a glass transition temperature of the PPS resin. If the metal mold is set at less than or equal to the glass transition temperature, virtually no burr is generated. A probable cause is that a tiny amount of the PPS resin about to enter a gap between the mating surfaces comes into contact with a surface of the metal mold at an edge of the mating surfaces and substantially loses liquidity because of an immediate drop in resin temperature to less than or equal to the glass transition temperature. This prevents the PPS resin from entering into the gap between the mating surfaces.

The graph of FIG. 7B shows measurement results of fracture strengths of cases that are formed of a PPS resin in a metal mold at respective temperatures changed from 20° C. to 170° C. in 10° C. increments. The fracture strengths were measured by tensile testing using a universal testing machine made by Amsler. As shown in FIG. 7D, jigs were fixed to the attachment tabs formed on the right and the left side surfaces of each case, and the case was pulled with the jigs in opposing directions to measure the fracture strength of the case. Ratios (percentages) of the fracture strengths of the cases formed at the respective metal mold temperatures with respect to the fracture strength of the case formed in the metal mold at a temperature of 150° C. were determined, and the graph of FIG. 7B shows the determined ratios as fracture strengths for the respective temperatures.

According to the graph of FIG. 7B, if the metal mold temperature during molding of the case is set at 60° C. or higher, the case is allowed to provide a fracture strength equivalent to the fracture strength of a case formed by conventional injection molding at a metal mold temperature higher than 90° C. The case cannot have a satisfactory fracture strength at a metal mold temperature of less than or equal to 50° C. It is considered that crystallization of the PPS resin at a metal mold temperature of less than or equal to 50° C. is inadequate to maintain fracture strength.

<Effects of Exemplary Embodiment>

According to the method for manufacturing a capacitor in this exemplary embodiment described above, case 20 is formed of the PPS resin, i.e. a thermoplastic resin, in the metal mold at a temperature that is set at less than or equal to 90° C., a glass transition temperature of the PPS resin. This prevents the generation of a burr on molded case 20. This in turn dispenses with a process of burr removal by abrasive blasting. As a result, surfaces of first connection pin terminal 440 and second connection pin terminal 450 which are integrated with case 20 by insert molding are not roughened by abrasive particles. Hence, contact areas of the surfaces, which are connected to external terminals, is not decreased. This averts an increase in electric resistance and does not hamper a flow of electric current. In addition, first connection pin terminal 440 and second connection pin terminal 450 are not deformed by the force of blasted abrasive particles and hence do not deteriorate in position accuracy. This averts that the connection pin terminals cannot smoothly connect with external terminals.

In particular, in a configuration similar to case 20 in the present exemplary embodiment, when inserted first connection pin terminal 440 and second connection pin terminal 450 are near to mating surfaces of metal mold 500, a burr is likely to be generated near first connection pin terminal 440 and second connection pin terminal 450. In order to remove such a burr, abrasive particles tend to be blasted against first connection pin terminal 440 and second connection pin terminal 450. Consequently, it is very useful to apply the method for manufacturing a capacitor in this exemplary embodiment to such a configuration.

If first connection pin terminal 440 and second connection pin terminal 450 are plated with gold, the gold plating may come off by blasted abrasive particles. This, if happens, can further increase electric resistance at the surfaces connected to external terminals and further hamper a flow of electric current. The present exemplary embodiment dispenses with a process of burr removal by abrasive blasting. This averts faulty electrical continuity that otherwise occurs between the external terminal and each of first connection pin terminal 440 and second connection pin terminal 450 due to the coming off of the gold plating.

According to the method for manufacturing a capacitor in this exemplary embodiment, case 20 is formed in the metal mold at a temperature that is set at 60° C. or higher. This prevents a decrease in the fracture strength of case 20 and allows the case to provide proper fracture strength. This allows case 20 to avoid breakage or damage to attachment tabs 420 and other parts even if case 20 expands or contracts due to a sudden change in temperature under ambient conditions.

In metal mold 500, gates 523 are formed at portions 511 of mold part 510 corresponding to respective three attachment tabs 420 of case 20. This configuration ensures that the PPS resin flows from portions 511 of mold part 510 corresponding to attachment tabs 420 to portion 512 of mold part 510 corresponding to case body 410. This averts that a join of the PPS resin flows occurs at the tip of each attachment tab 420 and a weld line is generated at the tip. This in turn prevents a decrease in strength of attachment tabs 420.

Although the exemplary embodiment of the present disclosure has been described above, the present disclosure is not limited to the exemplary embodiment described above, and moreover, various modifications can be applied to application examples according to the present disclosure besides the exemplary embodiment described above.

In the exemplary embodiment described above, case 20 is, for example, formed of the PPS resin. However, case 20 may be formed of a thermoplastic resin such as polyethylene terephthalate (PBT) other than the PPS resin. In this instance as well, the case can be made using the method for manufacturing a capacitor according to the exemplary embodiment described above. The case in this instance may be formed of a resin in metal mold 500 heated at a temperature that is less than or equal to a glass transition temperature of the resin. The temperature is higher or equal to a temperature at which the case is allowed to provide a fracture strength equivalent to the fracture strength of a case that is formed in metal mold 500 heated at a temperature higher than the glass transition temperature of the resin. The thermoplastic resin of which case 20 is formed may contain a filler or any of other additives of various types.

In the exemplary embodiment described above, in the process of manufacturing case 20, metal mold 500 is heated after metal mold 500 is assembled. However, components 501 to 504 may be heated before metal mold 500 is assembled.

Connection terminals integrated with case 20 by insert molding may be, for example, flat plate-shaped terminals other than pin-shaped terminals like first connection pin terminal 440 and second connection pin terminal 450 in the exemplary embodiment described above. The surfaces of the connection terminals may not be plated with gold.

In the exemplary embodiment described above, each attachment tab 420 of case 20 has collar 430 that is embedded inside attachment hole 421 by insert molding. However, a different process may be followed so that collar 430 is inserted in attachment hole 421 after case 20 is formed.

A number of capacitor elements 100 contained in film capacitor 1 is not limited to the number specified in the above-described exemplary embodiment and may be changed as appropriate depending on required electrical capacitance. In other words, two capacitor elements 100 are disposed in case 20 in the above-described exemplary embodiment. However, the number of capacitor elements 100 is not limited to this example. Any other number of capacitor elements 100 may be disposed in case 20.

In the exemplary embodiment described above, capacitor element 100 is formed by stacking two metalized films that are each a dielectric film on which aluminum is deposited, and winding or laminating the stacked metalized films. Alternatively, capacitor element 100 may be formed by stacking an insulator film and a metalized film that includes a dielectric film and aluminum deposited on both sides of the dielectric film, and winding or laminating this stacked material.

In the exemplary embodiment described above, case 20 housing capacitor unit 10 is filled with filler resin 30. However, case 20 may be hermetically sealed with the open face of case 20 closed such that case 20 is not filled with filler resin 30.

The method of manufacturing a capacitor according to the present disclosure may be used to manufacture any capacitor other than film capacitor 1 in the exemplary embodiment described above.

In addition, various modifications can be made to the exemplary embodiment of the present disclosure as appropriate within the scope of the technical idea disclosed in the appended claims.

It should be noted that, in the description of the above-described exemplary embodiment, a term indicating a direction, such as "upward" or "downward", indicates a relative direction that only depends on a relative positional relationship of constituent members, and does not indicate an absolute direction, such as a vertical direction or a horizontal direction.

The present disclosure is useful for manufacturing a capacitor for use in various types of electronic devices, electrical devices, industrial equipment, electric components for vehicles, and the like.

What is claimed is:

1. A method for manufacturing a capacitor, the method comprising:
   forming a case integrated with a terminal unit configured to be connected with an external terminal, the case being made of a polyphenylene sulfide resin; and
   housing a capacitor element in the case so that the terminal unit is electrically connected to the capacitor element,
   wherein the forming of the case further comprises:
      heating a metal mold to a predetermined temperature ranging from 60° C. to 90° C., inclusive, the metal mold internally having a mold part that is a hollow part having a shape of the case; and
      injecting, after the heating of the metal mold and inserting the terminal unit into the mold part, the polyphenylene sulfide resin in a molten state into the mold part of the metal mold while keeping a temperature of the metal mold at the predetermined temperature.

2. The method for manufacturing a capacitor, according to claim 1, wherein:
   the case includes an attachment part for attachment of the case, the attachment part having an attachment hole,
   the metal mold has a gate at a portion of the mold part, the portion corresponding to the attachment part, and
   the injecting is injecting the polyphenylene sulfide resin in a molten state from the gate into the mold part.

3. The method for manufacturing a capacitor, according to claim 1, wherein a surface of the terminal unit has plated gold.

* * * * *